United States Patent
Hudson

(10) Patent No.: US 6,597,391 B2
(45) Date of Patent: Jul. 22, 2003

(54) SECURITY SYSTEM

(75) Inventor: John Hudson, Farnborough (GB)

(73) Assignee: Sony United Kingdom Limited, Weybridge (GB)

( * ) Notice: Subject to any disclaimer, the term of this patent is extended or adjusted under 35 U.S.C. 154(b) by 0 days.

(21) Appl. No.: 09/153,109

(22) Filed: Sep. 15, 1998

(65) Prior Publication Data

US 2002/0186300 A1 Dec. 12, 2002

(30) Foreign Application Priority Data

Sep. 17, 1997 (GB) .............................................. 9719797

(51) Int. Cl.[7] .............................. H04N 7/18; G06F 9/00; G05B 23/02
(52) U.S. Cl. ......................... 348/153; 382/103; 340/3.1
(58) Field of Search ................................ 348/143, 144, 348/150, 151, 152, 153, 154, 155, 159, 169, 170; 382/103; 340/3.1

(56) References Cited

U.S. PATENT DOCUMENTS 4,511,886 A * 4/1985 Rodriguez .................. 348/153
4,673,974 A * 6/1987 Ito et al. ..................... 348/159
5,194,954 A   3/1993 Duffield .................... 358/193.1
5,264,929 A   11/1993 Yamaguchi ................. 358/108
5,583,796 A * 12/1996 Reese ......................... 348/159
6,084,631 A * 7/2000 Tonkin et al. .............. 348/212

FOREIGN PATENT DOCUMENTS

EP    0 371 150    6/1990
GB    2 257 593    1/1993

* cited by examiner

Primary Examiner—Gims S. Philippe
(74) Attorney, Agent, or Firm—Frommer Lawrence & Haug LLP; William S. Frommer; Dennis M. Smid

(57) ABSTRACT

A security system has a plurality of cameras (C1 to C7) presenting different views of an area. The system is programmed to present on a display means (M11) a predetermined hierarchy of views (FIG. 5). Each level of the hierarchy comprises one or more sets (A, B, C, D) of views. Each set comprises one or more (e.g. two views (2, 3; 5, 6) presented simultaneously on the display means (M11). The set of views in one level are linked in ap reset manner to views in adjacent levels. The sets of views and the organization of the hierarchy corresponds to the configuration of the area (FIG. 4).

6 Claims, 5 Drawing Sheets

SECURITY SYSTEM

BACKGROUND OF THE INVENTION

1. Field of the Invention

The present invention relates to apparatus for use in a security system. Illustrative embodiments of the invention relate to a security system comprising video cameras, the apparatus and monitors for displaying images received by the cameras.

2. Description of the Prior Art

Security CCTV systems are now finding widespread use in monitoring shopping centres, town centres, and commercial and industrial buildings.

The size of these systems may vary from one or two video sources for small retail outlets, petrol stations etc., to large town centre installations which may have greater than a hundred video sources with hundreds of alarm input signals.

In large installations, a great deal of security information is provided to the operators for evaluation. Such large security systems are typically managed by a system controller which can: provide access to a large number of video sources (for example a hundred video screens) and many hundreds of alarm signals; allow control of pan and tilt heads for each camera; provide some control panels (e.g. ten or fewer control panels) for enabling an operator to interact with the system; and present video information on some (e.g. 30 or more) video monitors.

Managing this information to ensure that any incident may be efficiently and effectively identified, dealt with and recorded for evidential purposes can be very operator intensive.

To improve the efficiency of the monitoring process, large security sites are often partitioned or broken down into areas, with one operator assigned responsibility for monitoring each area.

System controllers may provide the facilities to effectively partition an installation into a number, (e.g. eight) of fully functioning sub-systems. Each sub-system has a control interface, a number of video monitors, and access to a sub-set of the video sources and alarm information from the complete installation.

The monitors are watched by operators who use the control panels, e.g. in response to alarms, to control the views presented by the cameras in order to determine the cause of an alarm. Even by assigning one operator to each partition of an installation, an event may trigger many alarms and present the operator with an overwhelming amount of alarm and video information.

Even with partitioning of a site into areas and the assignment of one operator to each area, an operator may still have many cameras providing many different views of the area for which he is responsible.

In the event of an emergency, such as an unauthorised intruder, the operator may be faced with too many views of his area and many choices for changing and/or limiting the views to efficiently follow the intruder.

SUMMARY OF THE INVENTION

According to the present invention there is provided apparatus for use in a security system, the security system having a plurality of cameras presenting different views, the apparatus being programmable to present, on a display means, a predetermined hierarchy of predetermined sets of views, each set comprising one or more views presented simultaneously on the display means, the hierarchy having a plurality of levels, each level comprising a said set, a set in one level being linked to a predetermined set in an adjacent level.

Thus the invention provides a hierarchy of preset views and/or combinations of views. Because a set in one level is linked to a preset set in the next level, the operator is provided with simple choices when changing from one level in the hierarchy to the next.

In a practical embodiment of the invention, used for surveillance of an area such as a town centre or building, the hierarchy of views and the combinations of views in each level of the hierarchy are related to the layout of the area and routes available in the area between exit points and entrance points.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
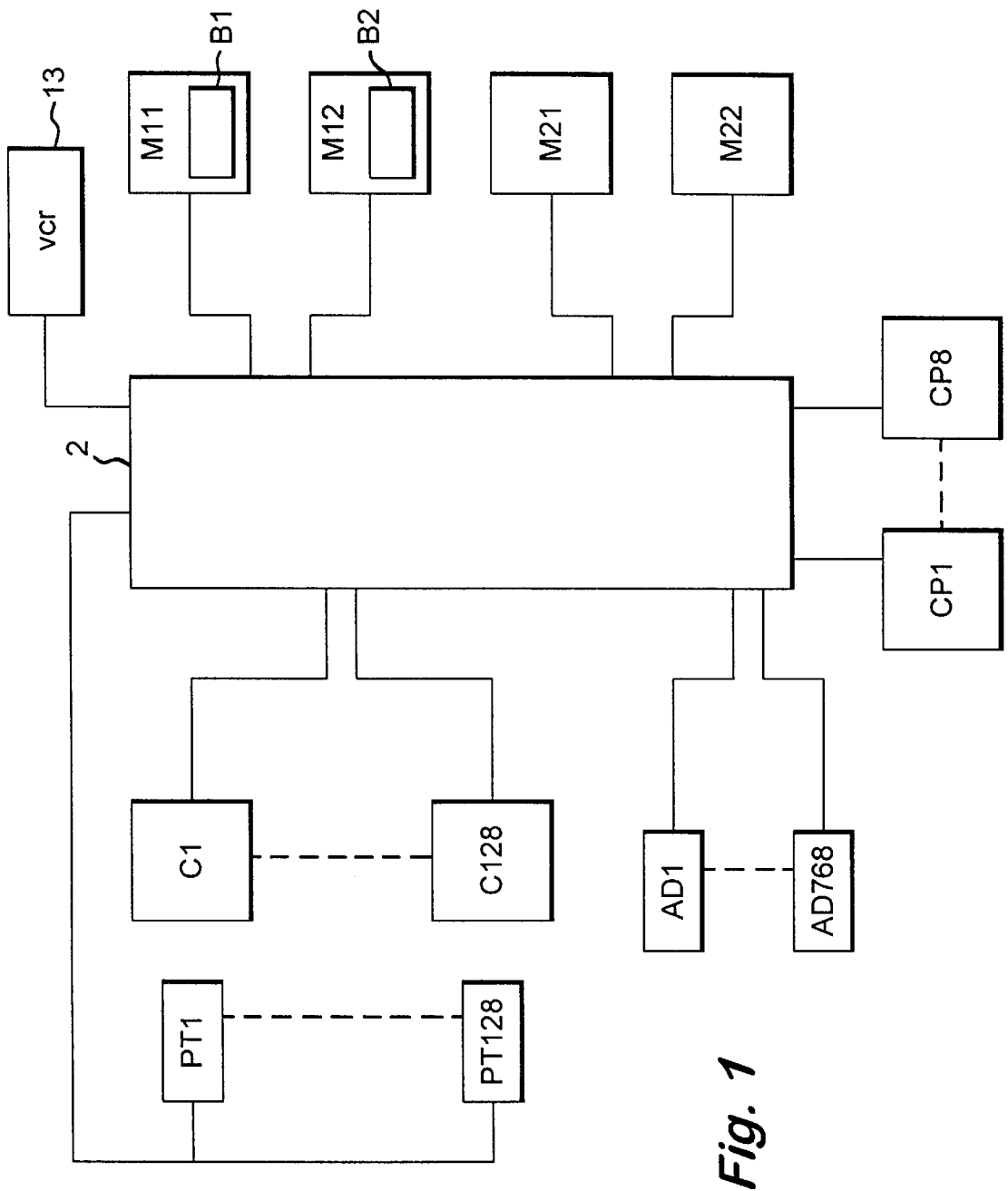
FIG. 1 is a schematic block diagram of an illustrative security system in which aspects of the present invention are implemented.

Referring to FIG. 1 an illustrative security system in accordance with the present invention comprises 128 cameras C1–C128. At least some, and in this example all, of the cameras have pan and tilt heads PT1–PT128. The system also comprises 768 alarm detectors AD1–AD768. One or more video cassette recorders (VCR) 13 may be provided for recording the video signals produced by the cameras.

A system controller 2 receives analogue video from the cameras C1–C128, and alarm signals from the alarm detectors AD1–AD768. The controller 2 provides control signals to the pan and tilt heads.

Up to eight control panels CP1 to CP8 are provided. There my be more than 8 panels. The control panels CP1–CP8 are used to program the system controller 2 and also are used by operators to control the system in use.

The controller 2 controls in accordance with its programming the display of video from the cameras, and the display of alarms, on four monitors M11, M12, M21, M22.

Figure 2:
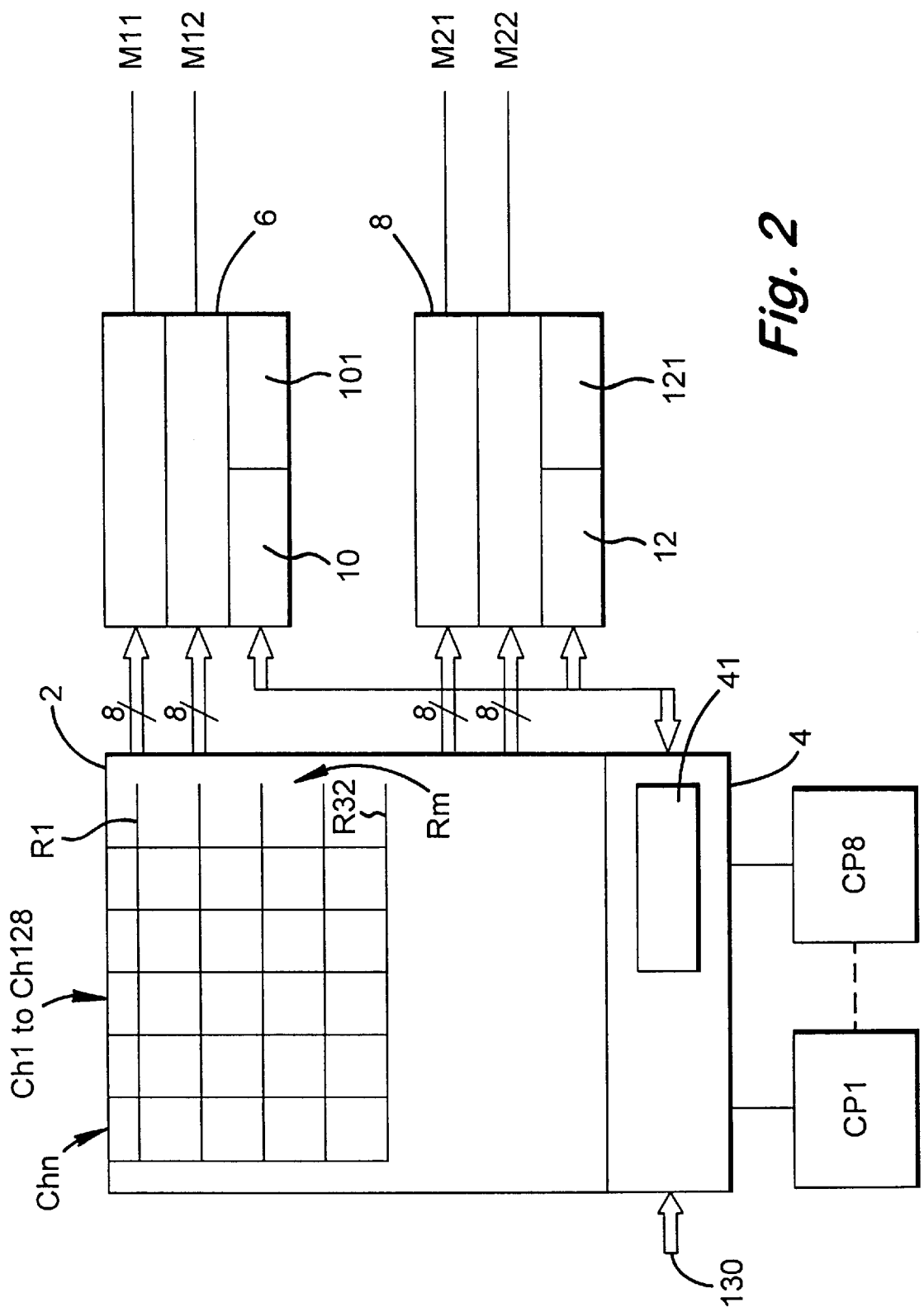
FIG. 2 is a more detailed block diagram of the system controller of the system of FIG. 1.

Referring to FIG. 2, the system controller 2 comprises a video switcher having 128 analogue video inputs and 32 analogue video outputs. The inputs are shown as (vertical) columns Chn, Ch1–Ch128 in FIG. 2, and the outputs as horizontal rows Rm, R1–R32. Video switches are controlled by a programmable controller 4, e.g a special purpose data processor or computer including program storage means 41 to connect the columns Chn to the rows Rm in any desired configuration. In addition, the connections can be varied in time.

The 32 outputs R1 to R32 are organised into four groups of eight outputs. One pair of groups or 16 outputs feed analogue video to a first multi-picture processor 6 and the other pair of groups or 16 outputs feed analogue video to a second multi-picture processor 8.

Each multi-picture processor 6, 8, comprises two identical channels both controlled by a common control processor 10, 12 having a program storage means 101, 121. Each channel processes one group of eight analogue video inputs Ri to Ri+7 e.g. R1–R8.

The monitors M11 M12 are controlled by the two channels respectively of processor 6 and the monitors M21 and M22 are controlled by the two channels of processor 8.

The control processors 10, 12 are linked to the programmable controller 4 to control the display of information on the monitors in accordance with the programming of the controller 4. Programming of the controller 4 correspondingly programs the control processors 10 and 12.

Figure 3:
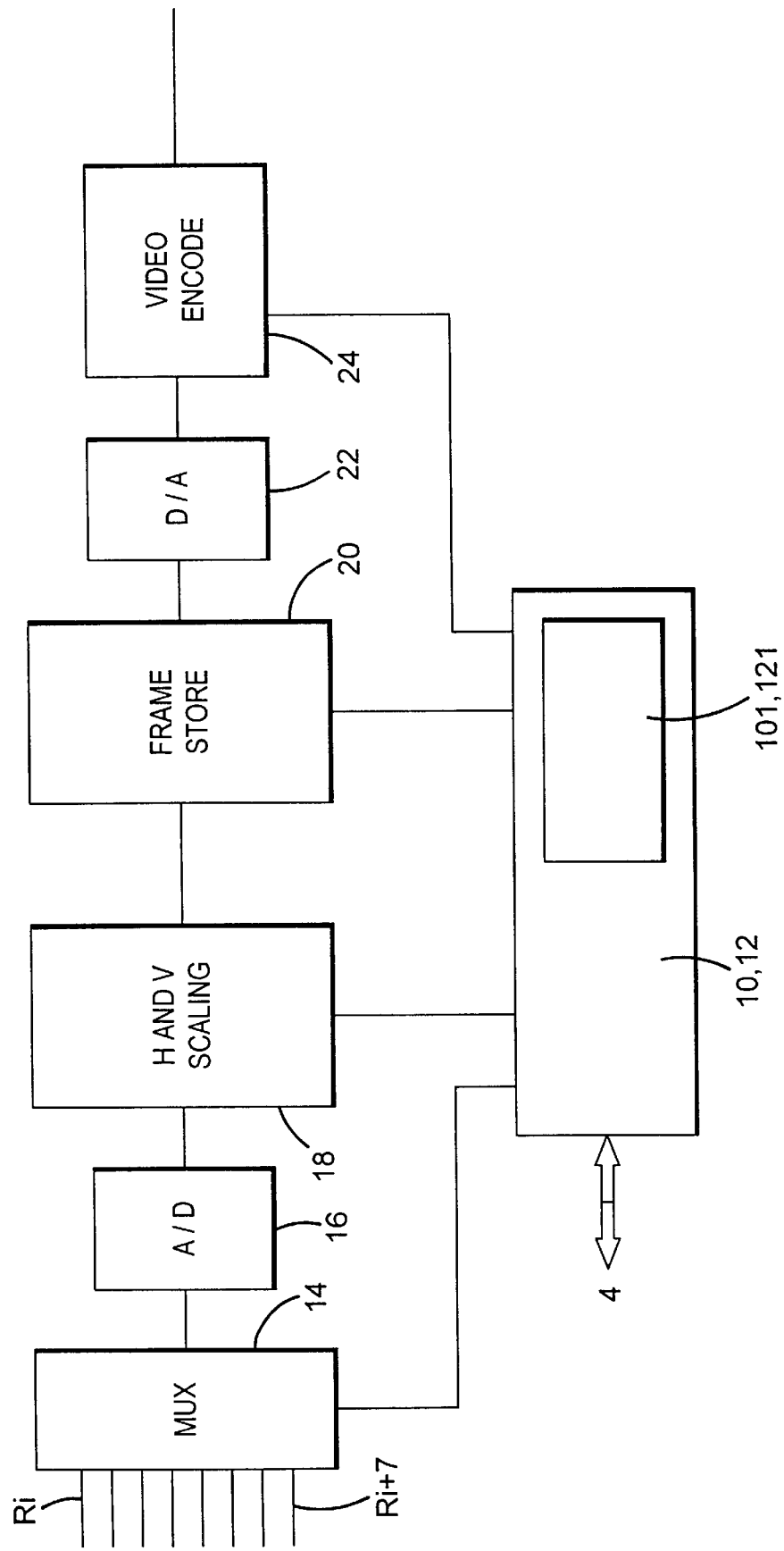
FIG. 3 is a schematic block diagram of a video signal processing channel associated with one monitor of the system of FIGS. 1 and 2.

Referring to FIG. 3 each channel of the multipicture processors comprises a multiplexer 14 having eight inputs corresponding to one group of video inputs Ri—Ri+7 and one output. The multiplexer 14 is controlled by the control processor 10, 12 to feed any selectable one of the inputs Ri—Ri+7 to an analogue to digital converter 16. The resulting digital video is fed to a circuit 18 which under the control of the processor 10, 12 scales the video horizontally and vertically to produce an image of desired size (e.g. full screen, ¼ size, ⅑ size).

The thus scaled image is stored in a frame store 20 under the control of the processor 10, 12. The processor 10, 12 controls the write addresses of the store to position the scaled image in a desired position for display, to allow picture-in-picture displays (PIP displays) or a desired number of pictures to be displayed in an array of pictures e.g. four or eight pictures on one monitor, as will be described hereinbelow.

The image or images stored in the frame store 20 are read-out via a digital to analogue converter 22 to a video encoder 24. The video encoder 24 encodes the video to be compatible with the monitors M11, M12, M21, M22. The video encoder 24 is also controlled by the processor 10, 12 to carry out other functions as will be described hereinbelow.

The system described herein above may operate on monochrome video signals. Alternatively colour video signals may be processed. Although the cameras produce analogue signals, the system could be modified to operate on digital signals produced by the cameras.

A preferred version of the system, as shown in FIG. 1 includes the 768 alarm detectors. The programmable controller 4 includes in its program store 41 a look-up table which is programmable to associate the cameras with one or more, e.g. a group of 4, alarm detectors AD.

Figure 4:
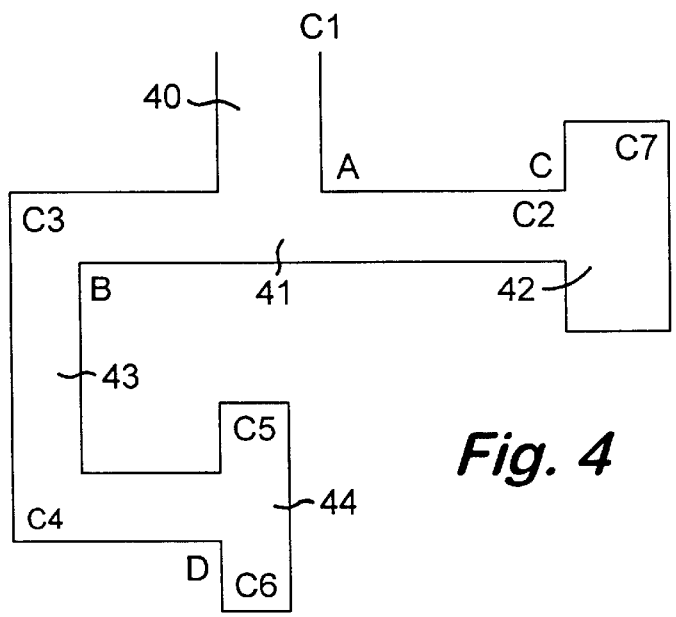
FIG. 4 is an illustrative schematic diagram of a security area equipped with a security system embodying the present invention.

Referring to FIG. 4, a building has an entrance 40 viewed by a camera C1. The entrance leads into a corridor 41 which has at one end a room 42 and which leads into another corridor 43 at the other end. The corridor 42 is viewed by two cameras C2 and C3 at the one and the other ends respectively. The room 42 is viewed by a camera C7. The corridor 43 is viewed by a camera C4. The corridor 43 leads into a room 44 viewed by two cameras C5 and C6.

Figure 5:
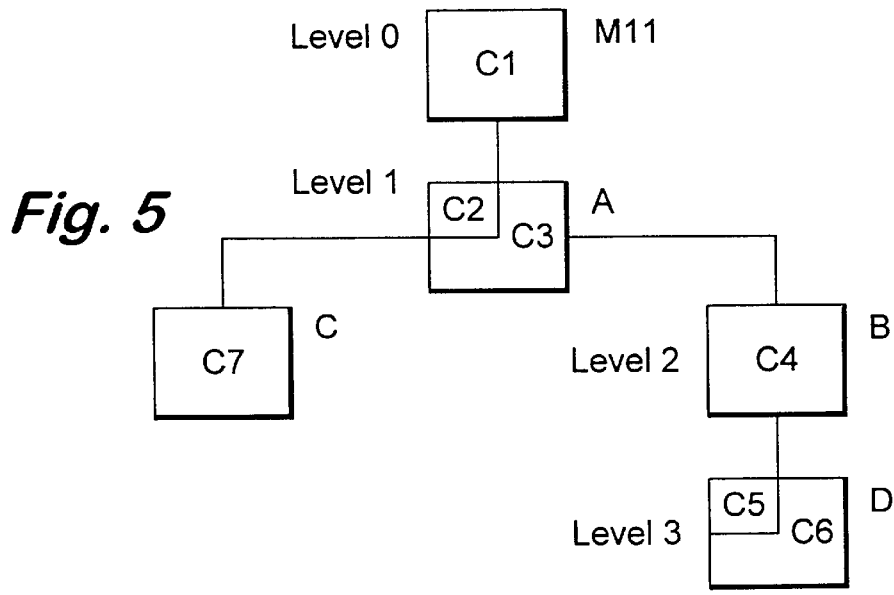
FIG. 5 illustrates a hierarchy of displays associated with the area shown in FIG. 4.

Referring to FIGS. 4 and 5, assume a visitor enters at the entrance 40. The visitor is viewed by camera C1 and a whole screen display from camera C1 is displayed on a monitor M11; that whole screen display is the top level (level 0) of a hierarchy of predetermined displays. When the visitor reaches the corridor 41, he is in view of cameras C2 and C3.

The operator, at a time of his choosing, selects the next level of the hierarchy (level 1), e.g. by actuating a down arrow on a keyboard, and sees on the same monitor M11 predetermined display A which is a PIP display with the camera C2 view inset as a ¼ size image in the camera C3 view.

The visitor can more towards camera C2 or camera C3. If he moves towards camera C2, the operator selects the next level 2 associated with camera C2; i.e. display C comprising the view from camera C7 appears on monitor M11. The level 2 view from camera C7 is linked to the level 1 view from camera 2. If the visitor moves towards camera C3, the operator selects the next level 2 associated with camera C3, i.e. display B comprising the view from camera C4. The display B is linked to the view from camera 3 in level 1.

Where at, e.g. level 2, the operator has 2 or more pictures each of which is linked to the next level 3, the operator selects a desired one of those pictures and then uses the down key to select the next level from that one of the pictures. To select one of several pictures, the pictures are numbered and the operator enters the number of the selected picture. For example, if picture no. 2 is to be selected he enters on the keyboard of his control panel *2*. Other means of selection may be provided. For example a touch-sensitive display may be used.

As the visitor moves to and past camera C4, the operator selects the next level 3, i.e. display D comprising views from cameras C5 and C6 arranged as a PIP display, which is linked to display D in level 2.

Assume, by way of example, an intruder breaks into the building at room 44 by camera C6, setting off an alarm. The system control associates the resulting alarm signal with cameras C5 and C6 and immediately automatically displays display D on the monitor M11.

By virtue of the linking of views in the levels, the operator can manually traverse through the levels of the hierarchy tracking movement of the intruder, without having to guess which camera will provide the best view.

Preferably a display such as D associated with an alarm is visually emphasised to the operator by, for example a coloured (e.g. red) border. The border may flash for added emphasis. Multiple alarms in different areas may be viewed by the operator very simply. It is possible for the operator to request more alarm views, and the multipicture processor 6, 8 will automatically traverse all hierarchical displays for all zones in sequence showing selected views of each alarm in turn. As alarm conditions become invalid, the operator may "clear" the alarm condition in any zone. As alarm conditions are "cleared", the multipicture processor 6, 8 will automatically display the next valid alarm view. This ensures that only relevant information is displayed to the operator.

By way of explanation, the relationship between "alarm conditions" and "alarm signals" is as follows. When an alarm is raised, for example, by a movement detector detecting movement within an unoccupied area, then an alarm signal is generated and input to the system controller of the security control system. The receipt of the alarm signal generates an alarm condition within the security control system, which causes the image associated with the alarm condition to be displayed. When an operator has noted any particular alarm condition, he/she can clear that alarm condition, which will cause the image associated with that alarm condition to be removed from the display means. This action does not in itself remove the alarm signal, the alarm signal only being removed by sending a reset signal to the device generating that alarm signal. However, the alarm condition associated with that alarm signal will not be re-triggered until that alarm signal has been reset. In preferred embodiments, a permanent record of all alarm signals generated is kept, even after an operator has cleared particular alarm conditions.

An alarm condition can be used to trigger a VCR 13 to record.

Thus, a predetermined hierarchy of predetermined displays arranged in successive levels are shown on one monitor M11, views in one level being linked in a preset manner with views in adjacent levels. The displays in the hierarchy and the sequence of the displays are chosen to correspond to the layout of the building, thus reducing the burden on the operator and reducing the likelihood that important information is missed.

The example of FIG. 4 involves seven cameras linked to one monitor M11, covering one area having up to eight (in this case, seven) monitored zones. The hierarchy of displays A to D and the manner in which they are interlinked (as illustrated in FIG. 5) are stored in the control processor 10, 101; 12, 121 of the multipicture processor 6, 8. In the example of FIGS. 4 and 5 there is only one hierarchy.

Figure 6:
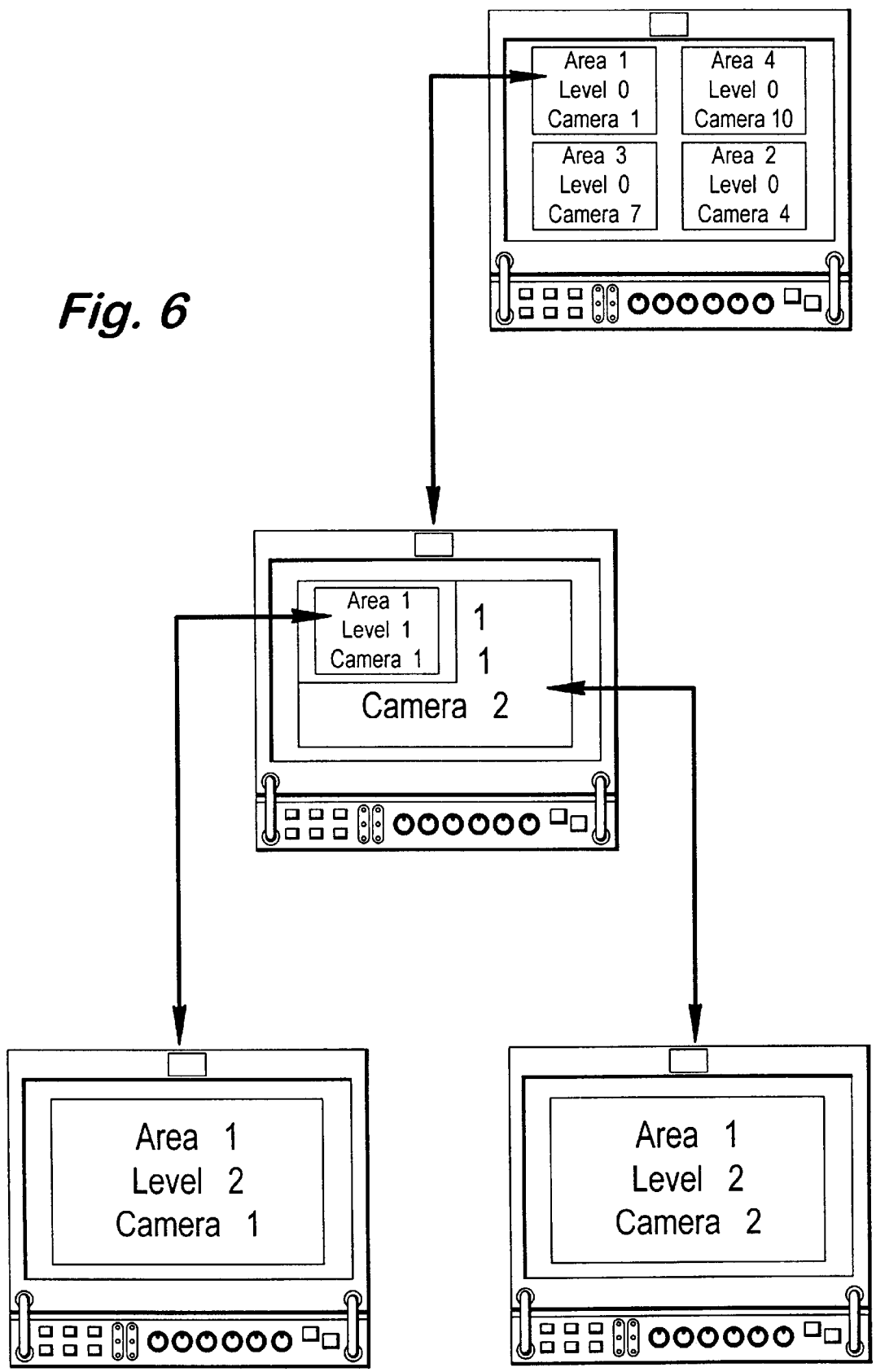
FIG. 6 illustrates another hierarchy of displays.

However, there may be many different hierarchies. Referring to FIG. 6, at level 0 a plurality of areas (e.g. four areas 1 to 4) may be monitored and a separate and different hierarchy may be associated with each area. FIG. 6 shows a hierarchy associated with area 1 involving only two cameras.

Figure 7:
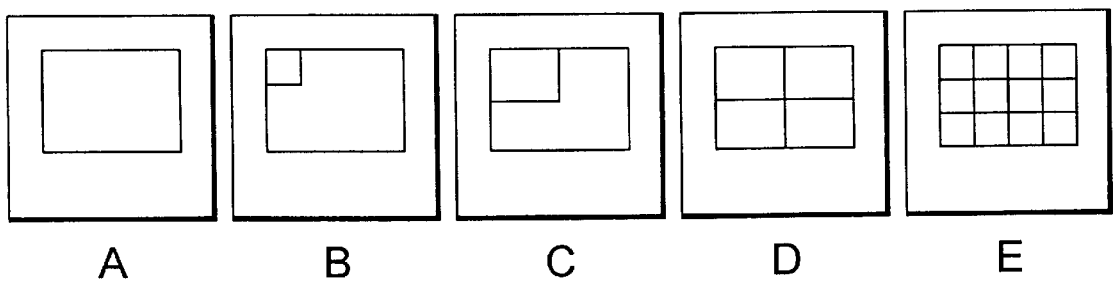
FIG. 7 illustrates possible display formats.

Each level in the hierarchy may use any of the illustrative display formats A to E shown in FIG. 7, where:

| | |
|---|---|
| A | Full screen single image |
| B | Picture-in-picture display (PIP) 1/9 image inset |
| C | PIP 1/4 size inset |
| D | Array of four 1/4 size images |
| E | Array of eight 1/9 size images |

Any camera view may be placed in any position within the various formats.

As shown in FIG. 6, the area identification, camera identification and/or hierarchy level may be displayed optionally together with the date and/or time.

In summary of the above described embodiments a security system has a plurality of cameras (C1 to C7) presenting different views of an area. The system is programmed to present on a display means (M11) a predetermined hierarchy of views (FIG. 5). Each level of the hierarchy comprises one or more sets (A, B, C, D) of views. Each set comprises one or more views (e.g. two views (2, 3; 5, 6)) presented simultaneously on the display means (M11). The sets of views in one level are linked in a preset manner to sets of views in adjacent levels. The sets of views and the organisation of the hierarchy corresponds to the configuration of the area (FIG. 4).

The top level 0 of the hierarchy may be used to preset an overview of an area subject to surveillance by the security system. The operator would manually traverse the levels when an event arises which requires traversal. The levels may be arranged to give progressively more detail, or as discussed above, to track routes through an area.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for use in a security system in a building having a plurality of cameras presenting different views, the apparatus comprising means for programming so as to present, on a display means, a predetermined hierarchy of predetermined sets of views, each set comprising one or more views presented simultaneously on the display means, the hierarchy having a plurality of levels, each level comprising one or more sets, each view in a set being linked to an adjacent level, and operator controlled means for selecting a view, wherein a sequence of images displayed on said display means correspond to a layout in said building so as to track routes through said building such that when a respective image is displayed on said display means the next image or images available to be selected by an operator for display correspond to a respective route or routes adjacent to a portion of said building shown by the respective image.

2. Apparatus according to claim 1 comprising:

video switch means for receiving video signals from the plurality of cameras;

a video signal processor, to which the switching means couples selected sets of the video signals for display of the sets of views reproduced thereby on a display device; and programmable control means for controlling the switching means and the video signal processor to present the said predetermined hierarchy of predetermined sets of views on the display device.

3. Apparatus according to claim 2, further comprising means for receiving alarm signals from alarm detecting means and for linking the alarm signals with video signals, the control means being responsive to an alarm signal to cause the display device to display the one of the said predetermined sets including the video signal linked to that alarm signal.

4. Apparatus according to claim 3, comprising operator controlled means for clearing the alarm indications, the said control means being responsive to clearing of an alarm indication to automatically display another one of the said predetermined sets including a video signal linked to another alarm signal.

5. Apparatus according to claim 1, wherein said operator controlled means enables said operator to select from a said set at a level, the linked set at an adjacent level.

6. Apparatus according to claim 1, programmed to present the said predetermined hierarchy.

* * * * *